(12) United States Patent
Wirthlin

(10) Patent No.: US 6,246,049 B1
(45) Date of Patent: Jun. 12, 2001

(54) OPTICAL TRANSDUCER

(76) Inventor: Alvin R. Wirthlin, 4964 S. Crescent Ave., Springfield, MO (US) 65804

( * ) Notice: Subject to any disclaimer, the term of this patent is extended or adjusted under 35 U.S.C. 154(b) by 0 days.

(21) Appl. No.: 09/332,203

(22) Filed: Jun. 12, 1999

(51) Int. Cl.[7] ........................................... G01D 5/34
(52) U.S. Cl. ................................................. 250/229
(58) Field of Search ........................ 250/231.1, 227.14, 250/229, 231.19, 227.22; 340/555–557; 200/61.27, 61.39, 61.46, 61.52

(56) References Cited

U.S. PATENT DOCUMENTS

| | | |
|---|---|---|
| 4,371,897 | 2/1983 | Kramer . |
| 4,727,247 | 2/1988 | Johnston . |
| 4,880,990 | 11/1989 | Rando . |
| 5,070,237 | 12/1991 | Okuyama et al. . |
| 5,132,530 | 7/1992 | Groh et al. . |
| 5,376,785 * | 12/1994 | Chin et al. ............... 250/214 PR |
| 5,448,835 | 9/1995 | Lewis . |
| 5,755,036 | 5/1998 | Lewis . |

FOREIGN PATENT DOCUMENTS

| | | |
|---|---|---|
| 0186138 | 7/1986 | (EP) . |
| 0766890 | 11/1998 | (EP) . |
| 2173894 | 10/1986 | (GB) . |
| 0117116 | 6/1985 | (JP) . |
| 0184706 | 7/1990 | (JP) . |

\* cited by examiner

Primary Examiner—Frank G. Font
Assistant Examiner—Tu T. Nguyen
(74) Attorney, Agent, or Firm—Alvin R. Wirthlin

(57) ABSTRACT

An optical transducer includes a light source, a fluorescent-doped fiber optic spaced from the light source for receiving radiant energy from the light source, and a light blocking member interposed between the fiber optic and the light collector. A photosensor is positioned adjacent each end of the fiber optic. The light blocking member extends between the light source and at least a portion of the fiber optic for blocking at least a portion of the radiant energy from the fiber optic. The light blocking member is movable with respect to the fiber optic in response to an applied force on the light blocking member for varying the position of the radiant energy incident on the fiber optic to thereby vary the amount of radiant energy transmitted to the fiber optic ends. With this arrangement, the amount of radiant energy received by the fluorescent-doped fiber optic and detected by the photosensor is indicative of the applied force. The applied force may be in the form of acceleration, gravity, rotation, torque, torsion, bending, fluid flow, vibration, and the like.

22 Claims, 11 Drawing Sheets

OPTICAL TRANSDUCER

BACKGROUND OF THE INVENTION

1. Field of the Invention

This invention relates to optical transducers, and more particularly to optical transducers for determining position, orientation, direction, revolution, acceleration, fluid flow, torque, and the like.

2. Description of the Related Art

Prior art angular position transducers typically include a transparent encoder disk and a circumferential track imprinted thereon. A light source is positioned on one side of the disk in alignment with the track and a pair of spaced photodetectors are positioned opposite the light source on the other side of the disk. Typically, each track comprises a series of equally-spaced opaque bars separated by transparent sections. As the disk rotates, the bars and transparent sections cause the photodetectors to alternate between high and low states. A microprocessor typically receives the high and low states of each photodetector and determines the direction of disk rotation depending on which photodetector goes high or low first. The number of high or low states are then added or subtracted (depending on the direction of disk rotation) in order to determine the angular position of the encoder disk.

Although these types of transducers perform adequately for their intended purpose, they can be relatively difficult and costly to manufacture and their resolution is typically limited by the number of bars in the circumferential track, the spacing between bars, the relative size of the transducers, and other factors. The bars must be accurately positioned on the disk, and the light source and photodetectors must be positioned very accurately with respect to the bars so that direction of disk rotation can be ascertained.

SUMMARY OF THE INVENTION

According to the invention, an optical transducer comprises a light source for emitting radiant energy, an elongate light collector spaced from the light source for receiving radiant energy from the light source, a light blocking member, and at least one photosensor. The light collector has opposite ends and is formed such that radiant energy emitted from the light source can be gathered along a length of the light collector and transmitted to the light collector ends. The light blocking member extends between the light source and at least a portion of the elongate collector for blocking at least a portion of the radiant energy from the light collector. The light blocking member is movable with respect to the light collector in response to an applied force on the light blocking member for varying the position of the radiant energy incident on the light collector to thereby vary the amount of radiant energy transmitted to the light collector ends. The at least one photosensor is positioned proximal at least one of the light collector ends for detecting the amount of radiant energy transmitted thereto. With this arrangement, the amount of radiant energy received by the light collector and detected by the photosensor is indicative of the applied force. The applied force may be in the form of acceleration (including deceleration), gravity, rotation, torque, torsion, bending, fluid flow, vibration, and so on.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. The invention will now be described with additional specificity and detail through the accompanying drawings.

DETAILED DESCRIPTION OF THE PREFERRED EMBODIMENTS

Figure 1:
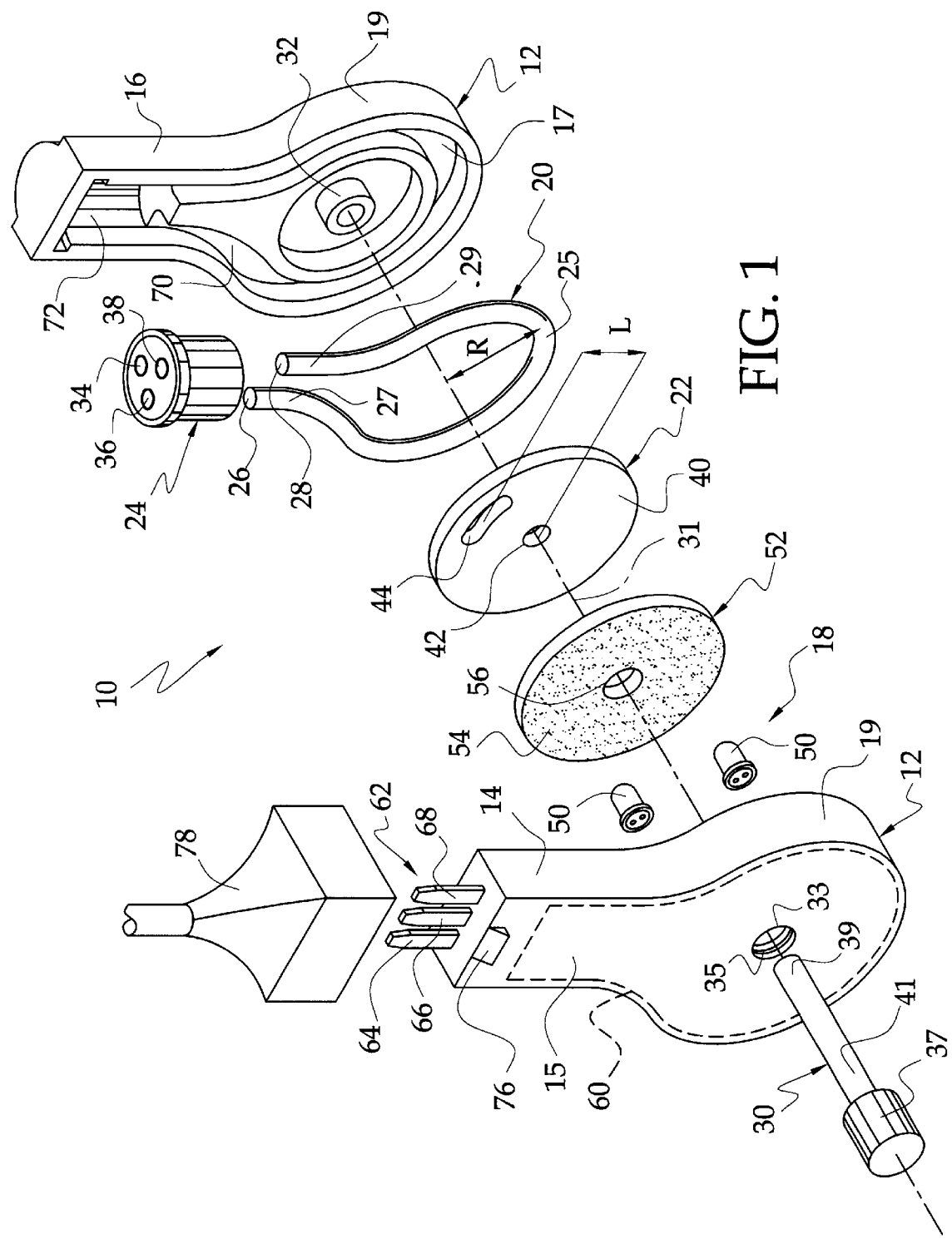
FIG. 1 is an exploded orthogonal view of an optical transducer according to a first embodiment of the invention.
Figure 2:
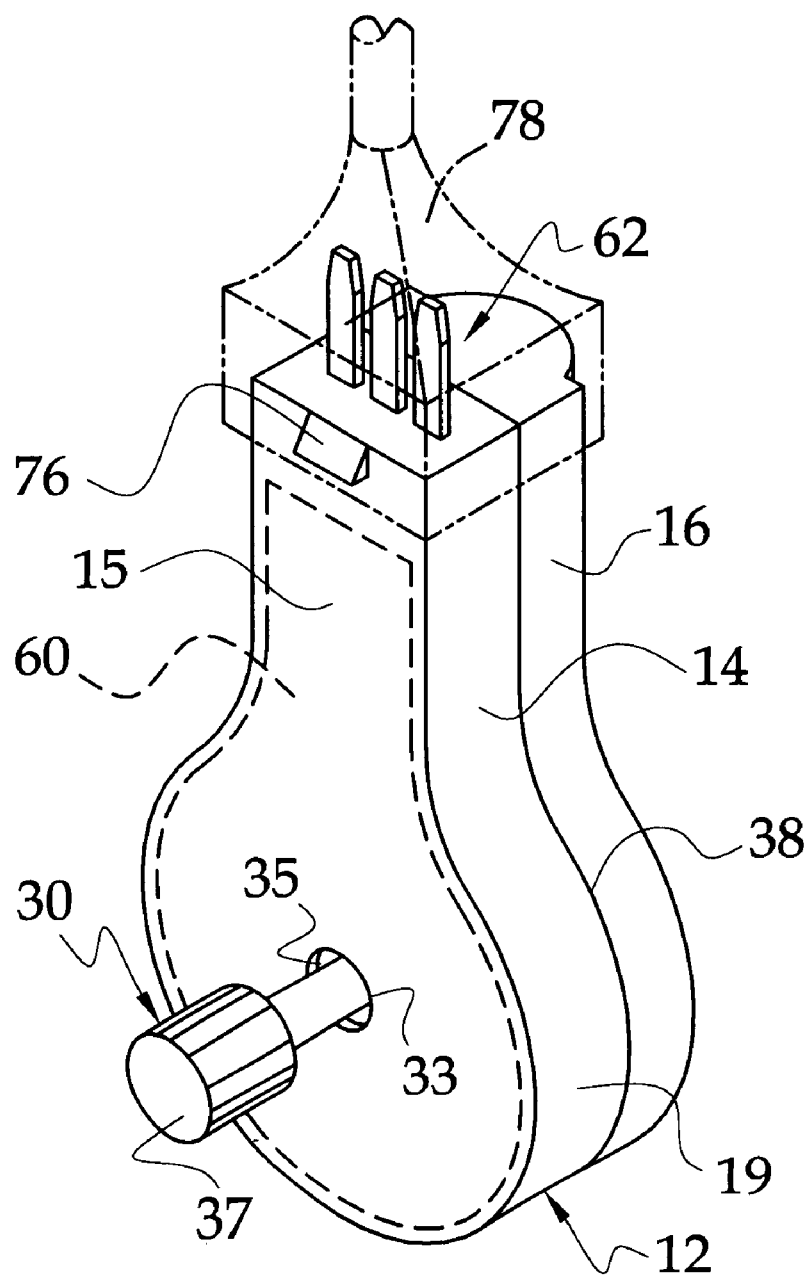
FIG. 2 is an orthogonal view of the assembled optical transducer of FIG. 1.

Referring now to the drawings, and to FIGS. 1 and 2 in particular, an optical transducer 10 according to a first embodiment of the invention is illustrated. The optical transducer 10 includes a housing 12 with a first housing half 14 and a second housing half 16, a light source 18 arranged for projecting radiant energy onto a light collector 20, a light blocking disk 22 interposed between the light collector 20 and the light source 18, and a photosensor module 24 arranged at the ends 26, 28 of the light collector 20. Preferably, the light source 18, collector 20, blocking disk 22 and module 24 are all located within the housing 12.

The housing 12 includes a front wall 15 formed on the first housing half 14, a rear wall 17 formed on the second housing half 16, and a continuous side wall 19 formed on both housing halves. When assembled, the continuous side wall 19 extends between the front and rear walls 15 and 17 to form an inner compartment A shaft 30 is rotatably mounted to the housing 12 about a rotational axis 31 and preferably includes an inner shaft portion 39 that extends through an opening 33 of the front wall 15 of the first housing half 14 and into a boss 32 formed on the rear wall 17 of the second housing half 16. The disk 22 is in turn fixedly mounted on the shaft 30 for rotation therewith. An enlarged head 37 may be formed on an outer shaft portion 41 of the shaft 30 for engaging other mechanical elements, such as arms, wheels, gears, and the like, that are rotatable with respect to the housing 12 or that are stationary with respect to rotation of the housing 12. An O-ring 35 is preferably installed in the opening 33 for keeping moisture, dust, and other particles out of the housing 12.

The first and second housing halves 14 and 16 may be connected together through bonding, ultrasonic welding, and/or mechanical fastening in a well-known, manner such that the connecting seam 38 (FIG. 2) between the two housing halves is both dust-proof and moisture-proof.

The light collector 20 is preferably in the form of a generally elongate fluorescent-doped or scintillating fiber optic that is shaped into an arcuate section 25 and straight portions 27, 29, with the ends 26, 28 of the straight portions terminating in a common plane. Although not shown, the arcuate portion may overlap. The arcuate section 25 is centered about the rotational axis 31 and has a predefined radius R. A suitable fluorescent-doped fiber optic may be constructed of a polystyrene-based core containing one or more fluorescent dopants that is surrounded by a polymethyl methacrylate cladding. When such a fiber optic receives radiation along its length, energy is absorbed in the fiber optic at a certain wavelength and is re-emitted at both ends of the fiber optic at a higher energy and longer wavelength. Thus, depending on the amount of radiation absorbed by the fiber optic along its length, a proportionate amount of radiation is emitted at the ends of the fiber optic. Although the fiber optic is preferably circular in cross section, it is contemplated that other cross sectional shapes such as oval, triangular, rectangular, arcuate, etc., may be used. Moreover, it is to be understood that the light collector 20 is not to be limited to the particular material as set forth in the exemplary embodiment. The core and cladding may be formed out of any suitable transparent or translucent materials, as long as the index of refraction of the core material is greater than the index of refraction of the cladding material. The cladding material itself may be air or other fluid surrounding the core.

The photosensor module 24 preferably comprises a pair of spaced photosensors 46, 48 (shown in hidden line in FIG. 3), such as a pair of spaced monolithic photodiodes that vary in electrical output in response to variations in light level to which each sensor is exposed. The module 24 includes a power or ground connection 34 and a signal output connection 36 and 38 for each photosensor 46 and 48, respectively. Alternatively, separate photosensors may be used in place of the module 24. Besides photodiodes, other suitable photosensors may be used, including but not limited to, photocells, phototransistors, photoconductors, and the like.

The photosensor module 24 is preferably positioned in the housing 12 such that each photosensor 46 and 48 is positioned adjacent one of the ends 26 and 28, respectively, of the collector 20. In this manner, one sensor 46 detects the level of light present at the end 26, while the other sensor 48 detects the level of light present at the end 28.

The blocking member 22 comprises a circular plate-like disk 40 having a central aperture 42 and a window 44 spaced from the aperture. The plate-like disk 40 is preferably opaque or otherwise constructed such that light emitted from the light source 18 is substantially blocked from reaching a substantial portion of the collector 20. The shaft 30 extends through the central aperture 42 and is fixedly connect to the disk 44 through welding, adhesives, or other well-known fastening techniques, such that rotation of the shaft causes simultaneous rotation of the disk. The window 44 is preferably formed as an arcuate opening that extends through the disk 40, but may alternatively be formed as a transparent section on the disk. When formed as a transparent section, the disk 40 may be constructed of a transparent material and an opaque coating may be applied to one or both of the disk surfaces outside of the window area. The window 44 is spaced from the rotational axis 31 a predetermined distance L that is preferably at least substantially equal to the radius R of the arcuate collector section 25 such that the window is aligned with the arcuate collector section during rotation of the disk 22. In this manner, light emanating from the light source 18 passes through the window and is incident over a predefined area of the collector 20 during rotation of the disk 22. The area of light incident on the collector 20 can be adjusted by varying the size of the window. Although the window 44 is shown as arcuate in shape, it is to be understood that the window may be circular, square, or any other suitable shape.

As shown, the light source 18 preferably comprises a pair of incandescent bulbs 50 that are oriented for projecting radiant energy toward the blocking disk 22 and the collector 20. The light source 18 may alternatively be in the form of one or more fluorescent lights, light-emitting diodes, laser diodes, or any other source that emits radiant energy in the visible, ultra-violet, or infra-red spectrums. When an infra-red light source is used, the or each photosensor is of the infra-red type, such as an infrared photodiode.

A light diffusing disk 52 can be fixedly connected to the first housing half 14 between the light source 18 and the light blocking disk 22. The diffusing disk 52 is preferably constructed of a transparent or translucent material and may include a roughened surface 54 that receives the emitted light from the light source 18 and distributes the emitted light in a more uniform manner to the blocking disk 22 and the collector 20. Although the roughened surface 54 is shown on a side of the disk facing the light source 18, the roughened surface may in addition or alternatively be formed on a side of the disk facing away from the light source. An opening 56 is centrally located in the diffusing disk 52 and provides sufficient clearance for passage of the shaft 30 without contacting the shaft.

A circuit board 60 (shown in hidden line) is preferably mounted in the first housing half 14 and includes circuitry (not shown in FIGS. 1 and 2) that receives and processes signals from the photosensor module 24. A terminal block 62 is also mounted to the housing and includes a power supply terminal 64, a ground terminal 66, and an output terminal 68 that receives the processed signals from the circuitry. If signal processing circuitry is to be located remotely from the optical transducer, then the circuit board may be eliminated. In this case, four terminals may be needed for transmitting both signals from the photodiodes to the remote circuitry, as well as providing power and ground. Where only one photodiode is used for measurement, then only three terminals may be provided when the signal processing circuitry is at a remote location.

The second housing half 16 includes a groove 70 that is shaped to receive the collector 20. The collector is preferably mounted in the groove through adhesives or other bonding techniques, but may alternatively be mounted with suitable brackets and/or fasteners (not shown). A semi-cylindrical depression 72 is also formed in the housing half 16 above the groove 70 for receiving the photosensor module 24. Electrical wires or traces (not shown) may extend between the terminals 34, 36 and 38 of the module 24 and the circuit board 60. A connector tab 76 is formed at an upper end of the first housing half 14 and a similar tab (not shown) is formed at an upper end of the second housing half 16.

A connector plug 78 is sized to receive the upper end of the housing 12 and includes internal terminals (not shown) that mate with the terminals 64, 66, and 68 for supplying power and ground to the optical transducer 10, and for receiving the processed signals from the optical transducer 10 and transferring the processed signals to a display or other output device. Depressions (not shown) may be formed in the connector 78 for engaging the connector tabs 76 of the housing 12. The depressions together with the tabs form a lockable connection between the connector 78 and the optical transducer 10 in a well-known manner.

Figure 3:
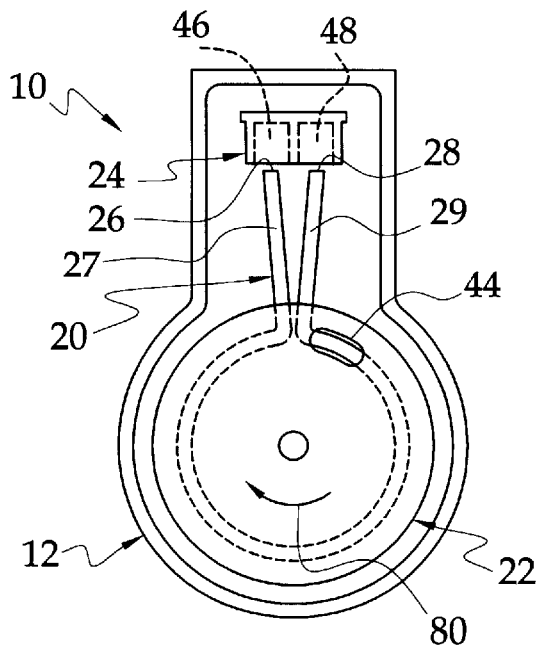
FIG. 3 is a front elevational view of a portion of the optical transducer of FIG. 2 and showing a light blocking member at a first rotational position.

Operation of the optical transducer 10 will now be described in conjunction with FIGS. 3 to 6. As shown in FIG. 3, the light blocking disk 22 is in a first position with the window 44 adjacent the straight portion 29 of the collector 20. Radiant energy from the light source 18 is received on a portion of the collector 20 that is exposed through the window 44. Due to the unique properties of the collector 20, more light will be present at the end 28 than at the end 26 of the collector. This is because the light path from the window 44 to the end 28 is shorter than the light path from the window 44 to the end 26. Light traveling along the longer light path is more subject to refraction out of the collector than the light traveling along the shorter light path due to the differences in the refractive index between the core and cladding materials. The light intensities at the ends 26 and 28 of the collector 20 are measured by the photosensors 46 and 48, respectively, to thereby give an indication of the position of the window 44 with respect to the collector, and thus the angular position of the shaft 30 with respect to the housing 12.

As the blocking disk 22 rotates in a direction represented by arrow 80, the distance between the incident light on the collector 20 and the end 28 increases and thus decreases the amount of light present at the end 28. Likewise, the distance between the incident light on the collector 20 and the end 26 decreases, and thus increases the amount of light present at the end 26. The increase and decrease in light intensities are measured by the photosensors 46 and 48, respectively, to thereby give new signals representative of the angular position of the shaft 30 with respect to the housing 12.

Figure 4:
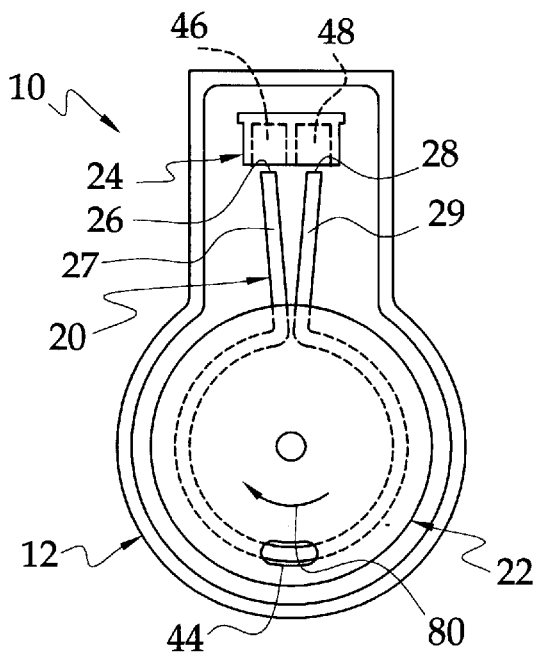
FIG. 4 is a view similar to FIG. 3 and showing the blocking member at a second rotational position.
Figure 5:
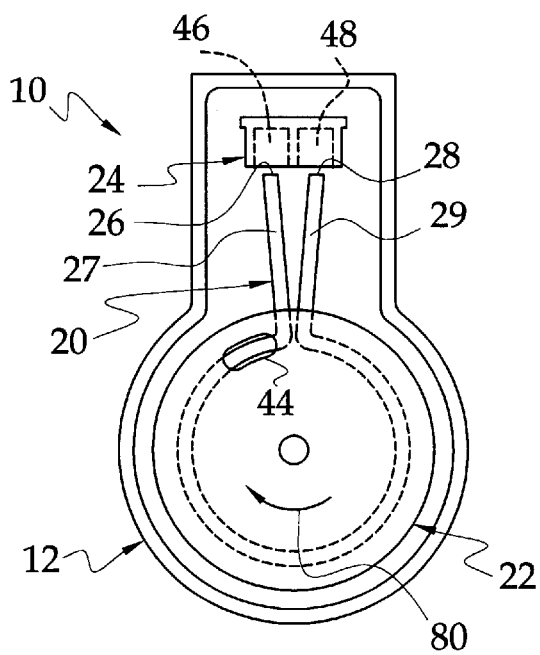
FIG. 5 is a view similar to FIG. 3 and showing the blocking member at a third rotational position.
Figure 6:
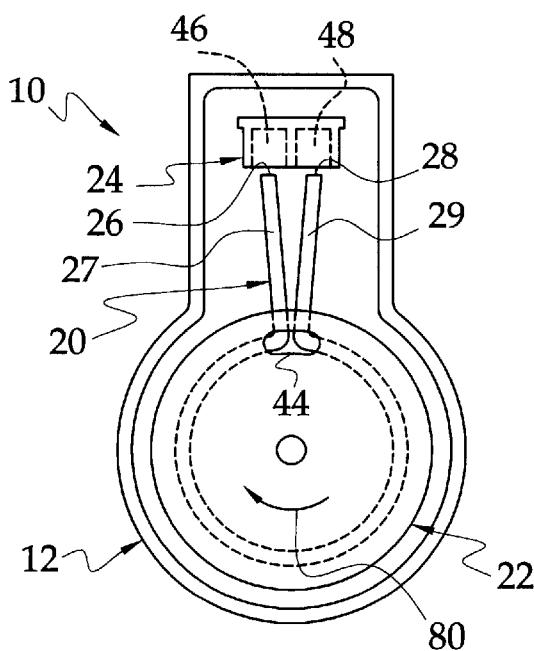
FIG. 6 is a view similar to FIG. 3 and showing the blocking member at a fourth rotational position.

When the window 44 of the blocking disk 22 arrives at the position shown in FIG. 4, the light intensities at the ends 26, 28 are substantially equal, since the light paths between the light incident on the collector and the ends 26, 28 are substantially equal. As the window 44 of the blocking disk 22 travels from the FIG. 4 position to the FIG. 5 position, the light intensity at the end 26 will be increasingly greater than the light intensity at the end 28 of the collector, again due to the shorter light path. Finally, when the window 44 of the blocking disk 22 is in the FIG. 6 position, the light intensities at both ends 26, 28 will be substantially equal, and will be greater than the light intensities of the FIG. 4 position, again due to the shorter light path between the window 44 and the ends 26, 28.

The above described arrangement is especially advantageous in that an infinite number of rotational or angular positions between the shaft and housing, as well as the direction of shaft rotation can be determined. Moreover, due to the differences in intensities on the ends 26, 28 between the upper window position (FIG. 6) and the lower window position (FIG. 4), the number of shaft rotations can also or alternatively be tracked.

Although two photosensors are preferred, it is to be understood that a single photosensor positioned adjacent one of the ends 26, 28 of the collector 20 may be sufficient in determining shaft position and rotational direction, along with shaft rotation, especially in environments where the light intensity from the light source 18, temperature, and other effects are substantially constant, or when intermittent calibration of the optical transducer can be performed with relative ease.

The above-described embodiment is not only useful for determining orientation and rotation, but may also be used as a compass for determining heading with respect to magnetic north. The disk 40 may be magnetized or a separate magnet may be connect to the disk for rotation therewith such that the disk is always oriented toward magnetic north.

Figure 7:
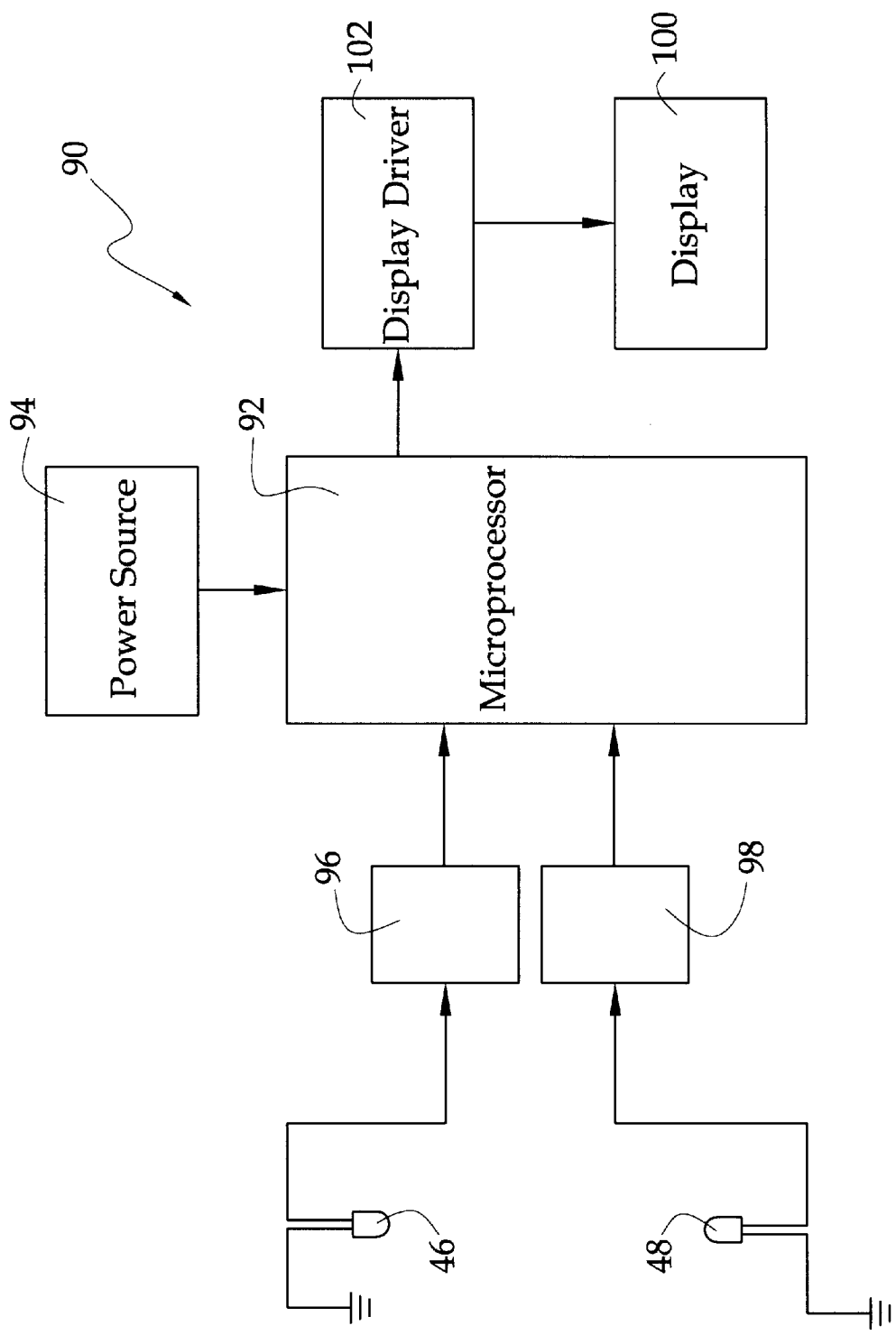
FIG. 7 is a block diagram schematic representation of electrical signal processing circuitry that may be used with all embodiments of the optical transducer of the present invention.

Referring now to FIG. 7, a schematic representation of an electrical processing circuit 90 is illustrated. The circuit 90 includes a microprocessor 92, an electrical power source 94 connected to the microprocessor, the photosensors 46 and 48 connected to the microprocessor via signal amplifiers 96 and 98, respectively, and a display 100 connected to the microprocessor through a display driver 102. Although many different types of signal amplifiers may be used, a dual operational amplifier for the signal amplifiers 96, 98, such as LM358 manufactured by National Semiconductor, is preferred due to its low cost, ability to operate with a single power supply, and relative ease in setting a desired gain factor. Although in many instances a signal amplifier may be necessary for the photosensors, the amplifier may be eliminated if the strength of the photosensor signals are great enough to be accepted by the microprocessor. The signal strength can be varied depending on the intensity of the light source emission, the amount of collector area exposed to the light source, as well as the diameter or other cross dimension of the collector.

The analog signals produced by the photosensors 46, 48 during rotation of the shaft 30 are amplified and sent to the microprocessor 92, preferably at different input ports. Preferably, the input ports of the microprocessor are analog input ports that receive and convert the signals to digital form before further processing. Alternatively, separate A/D converters or a multiplexer with a single A/D converter may be provided. The converted signals from the photosensors 46, 48 can then be normalized in the microprocessor 92 in order to compensate for variations in light output of the light source 18 due to aging and other factors, as well as variations in temperature. Normalization of the photodiodes is accomplished by mathematic manipulation of the converted photosensor signals. Namely, the following normalization formula can be programmed into the microprocessor:

$$D_N = \frac{D_1 - D_2}{D_1 + D_2}$$

where $D_N$ is the normalized output, $D_1$ is the signal from the photosensor 46, and $D_2$ is the signal from the photosensor 48. Depending on the location of the window 44 with respect to the collector 20, the normalized output may be positive or negative. The normalized output can then be further manipulated, if necessary, then sent to the display 100 via a display driver 102 in a well-known manner.

Figure 8:
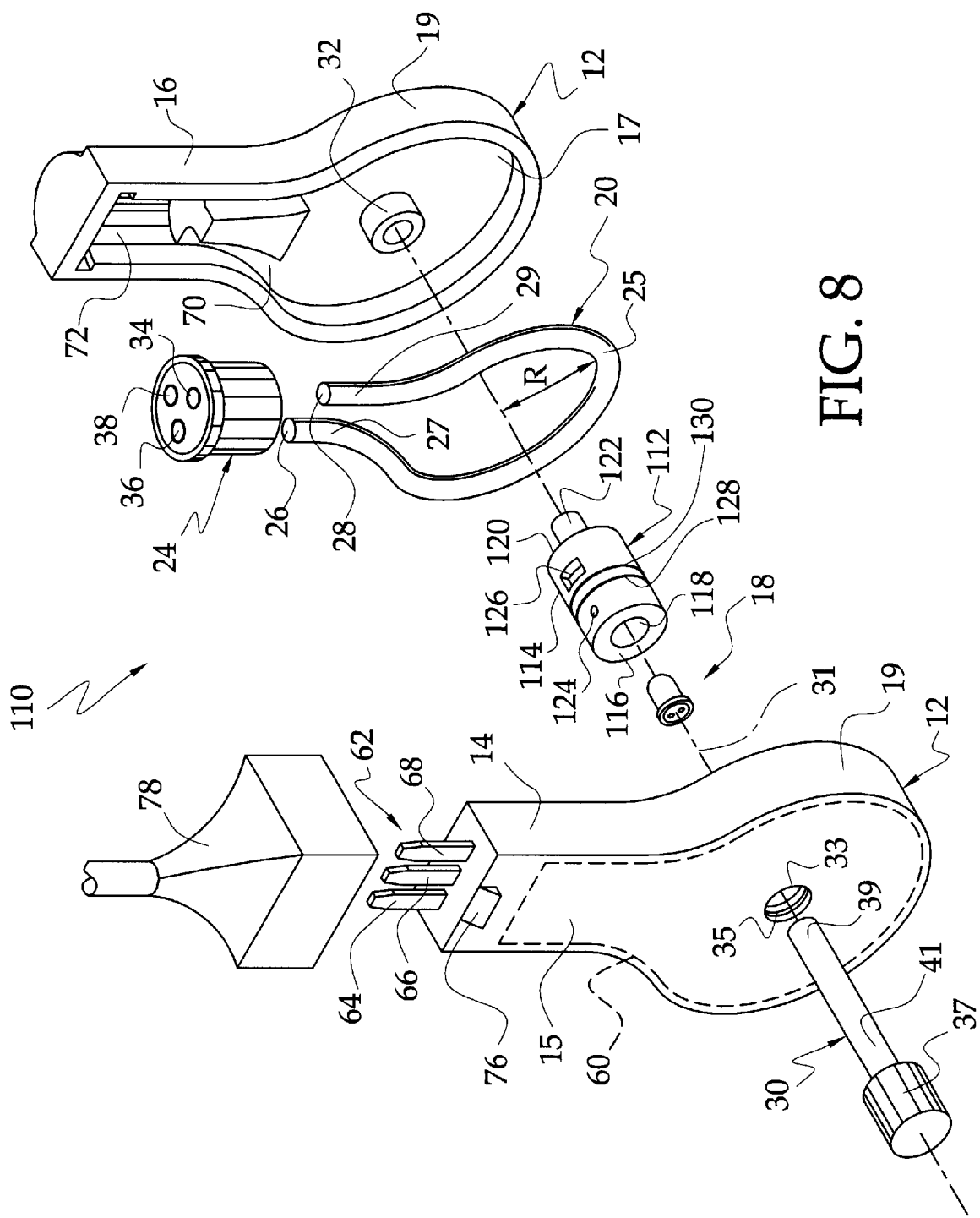
FIG. 8 is an exploded orthogonal view of an optical transducer according to a second embodiment of the invention.

Turning now to FIG. 8, an optical transducer 110 according to a second embodiment of the invention is illustrated, wherein like parts in the previous embodiment are represented by like numerals. The optical transducer 110 is similar in construction to the optical transducer 10, with the exception that a light blocking member 112 replaces the light blocking member 22 and the light source 18 is arranged on the rotational axis 31 of the shaft.

The light blocking member 112 is preferably tubular in construction and includes a continuous wall 114 with a first end 116 that opens into a bore 118 and a second end 120 that terminates in a pintle 122. The bore 118 receives the light source 18 and an end of the shaft 30. The shaft 30 may be secured to the blocking member 12 by a set screw (not shown) that is threaded into an aperture 124 in the wall 114. A window 126 is formed in the light blocking member 112 and is in radial alignment with the collector 20 such that radiant energy from the light source 18 projects onto the arcuate section 25 of the collector. The light source 18 may be powered by a pair of conductive rings 126, 128 mounted on the light blocking member 112. The conductive rings are in turn connected to a power source through brushes (not shown) or other electrical contacts that ride along the rings during rotation of the shaft 30. Each conductive ring has a leg portion (not shown) that extends through the wall 114 and contacts a terminal of the light source. The optical transducer 110 is similar in operation to the optical transducer 10, and therefore will not be described in further detail.

The above-described embodiments are also useful as a torque meter by fixing the inner shaft portion 39 against rotation in the housing 12. Any torque applied to the outer shaft portion 41 will cause torsional forces in the shaft and thus rotation of the light blocking disk 22. When used as a torque meter, the diameter of the shaft, as well as the shaft material, may be chosen to measure a desired range of torque.

Figure 9:
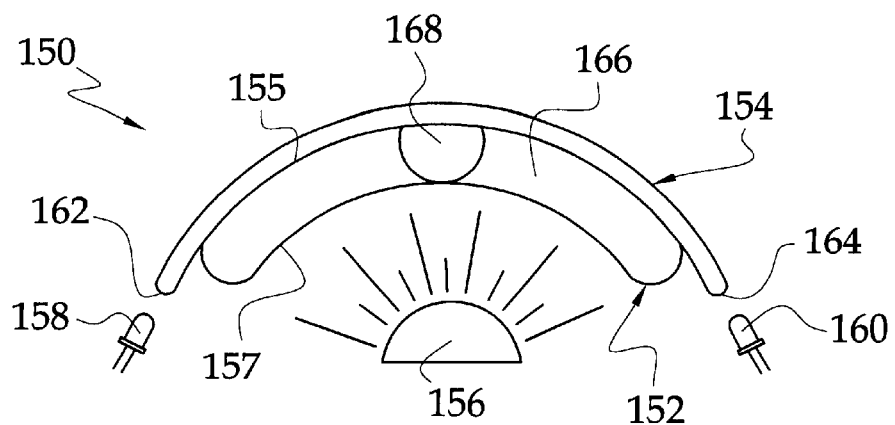
FIG. 9 is a front elevational view of an optical transducer according to a third embodiment of the invention in a first orientation.
Figure 10:
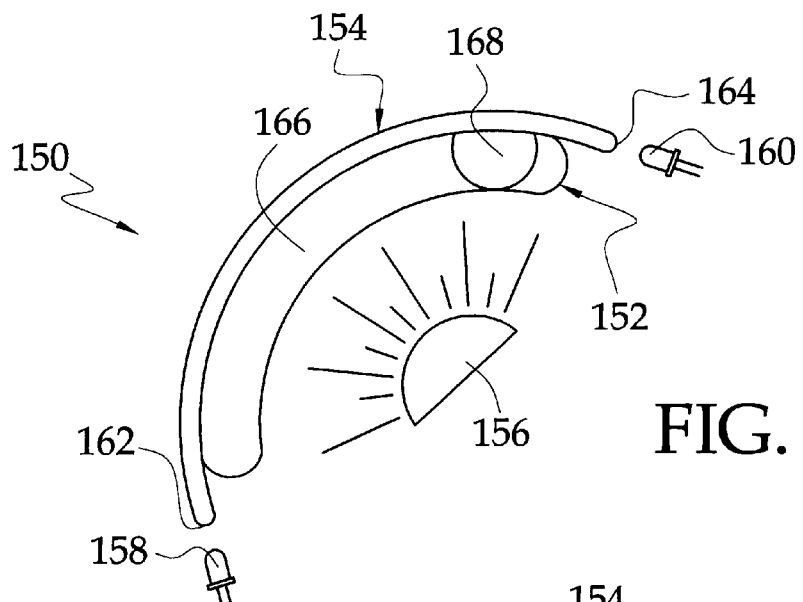
FIG. 10 is a view similar to FIG. 9 with the optical transducer in a second orientation.
Figure 11:
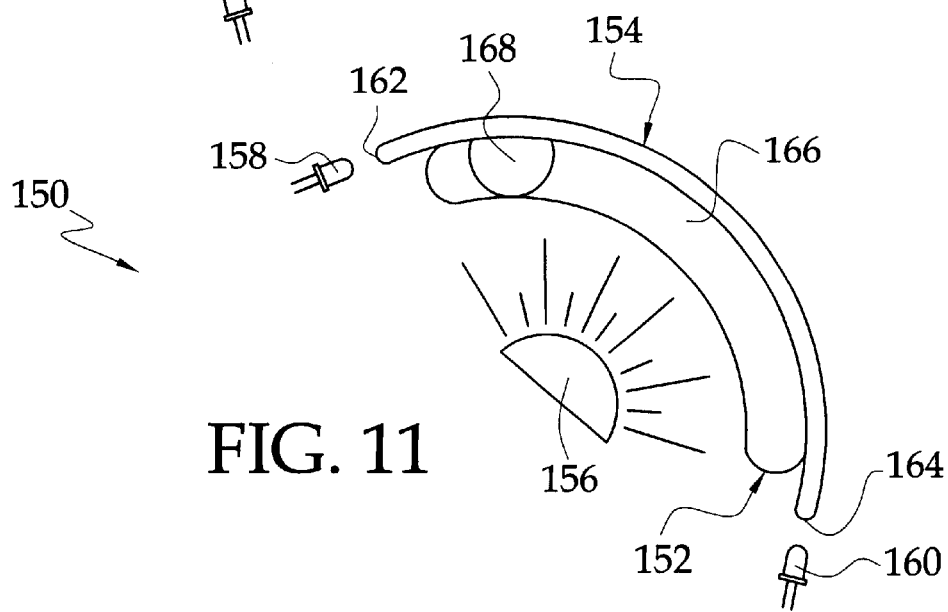
FIG. 11 is a view similar to FIG. 9 with the optical transducer in a third orientation.

With reference now to FIGS. 9 to 11, a schematic representation of an optical transducer 150 according to a third embodiment of the invention is shown. The optical transducer 150 includes an enclosed, arcuate vial 152, an elongate light collector 154 positioned adjacent a first side 155 of the vial and conforming to the shape thereof, a light source 156 located on a second side 157 of the vial opposite the collector 154 and arranged for emitting light toward the vial, and a photosensor 158 and 160 positioned adjacent opposite ends 162 and 164, respectively, of the light collector 154. An opaque light blocking liquid 166 or other flowable material that exhibits liquid-like properties, such as sand or other granular-like particles or material, is located in the enclosed vial 152 but does not fill the vial so that a relatively transparent bubble or window 168 extends through the vial from the first side 155 to the second side 157 thereof.

The collector 154 is preferably similar in construction to the collector 20 previously described such that light received on the collector 154 is transmitted to the ends 162, 164 of the collector and detected by the photosensors. Likewise, the light source 156 and photosensors 158, 160 can be constructed as previously described with the FIG. 1 embodiment, including any variations thereof.

When radiant energy is transmitted to the vial 152 from the light source 156, the opaque liquid at least substantially blocks the radiant energy from reaching the collector 154 with the exception of a portion of the radiant energy that is transmitted onto the collector 154 through the window 168.

As shown in FIG. 9, the window 168 is positioned approximately midway between the ends of the vial 152 and thus midway between the ends 162, 164 of the collector 154. In this position, the signals from the photosensors are approximately equal. As the optical transducer is tilted from the FIG. 9 position to the FIG. 10 position, the window 168 travels toward the end 164 of the vial until it reaches the highest point in the vial as the opaque liquid 166 flows to the lowest point of the vial under gravity. Consequently, the amount of light present at the end 164 increases while the amount of light present at the end 162 decreases. The increase and decrease in light intensities at the ends 164 and 162 of the collector 154 are measured by the photosensors 160 and 158 respectively, to thereby give new signals representative of the angular position of the optical transducer 150 with respect to horizontal or vertical.

Likewise, when the optical transducer is tilted in the opposite direction toward the FIG. 11 position, the window 168 travels toward the end 162 of the vial until it reaches the highest point in the vial as the opaque liquid 166 flows to the lowest point under gravity. Consequently, the amount of light present at the end 164 decreases while the amount of light present at the end 162 increases. The increase and decrease in light intensities at the ends 162 and 164 of the collector 154 are measured by the photosensors 158 and 160, respectively, to thereby give new signals representative of the angular position of the optical transducer 150 with respect to horizontal or vertical.

As in the previous embodiments, the direction of tilt can readily be ascertained by determining whether the signal strength is increasing or decreasing at one or both photosensors.

If desired, two such optical transducers 150 may be arranged in transverse planes to thereby determine the amount of tilt and roll of an object to which the optical transducers may be connected.

Although the optical transducer 150 is shown with an arcuate vial, it is to be understood that the vial may be formed as a substantially straight member. As in the previous embodiments, only a single photosensor may be used to determine the angular orientation of the optical transducer 150.

Figure 12:
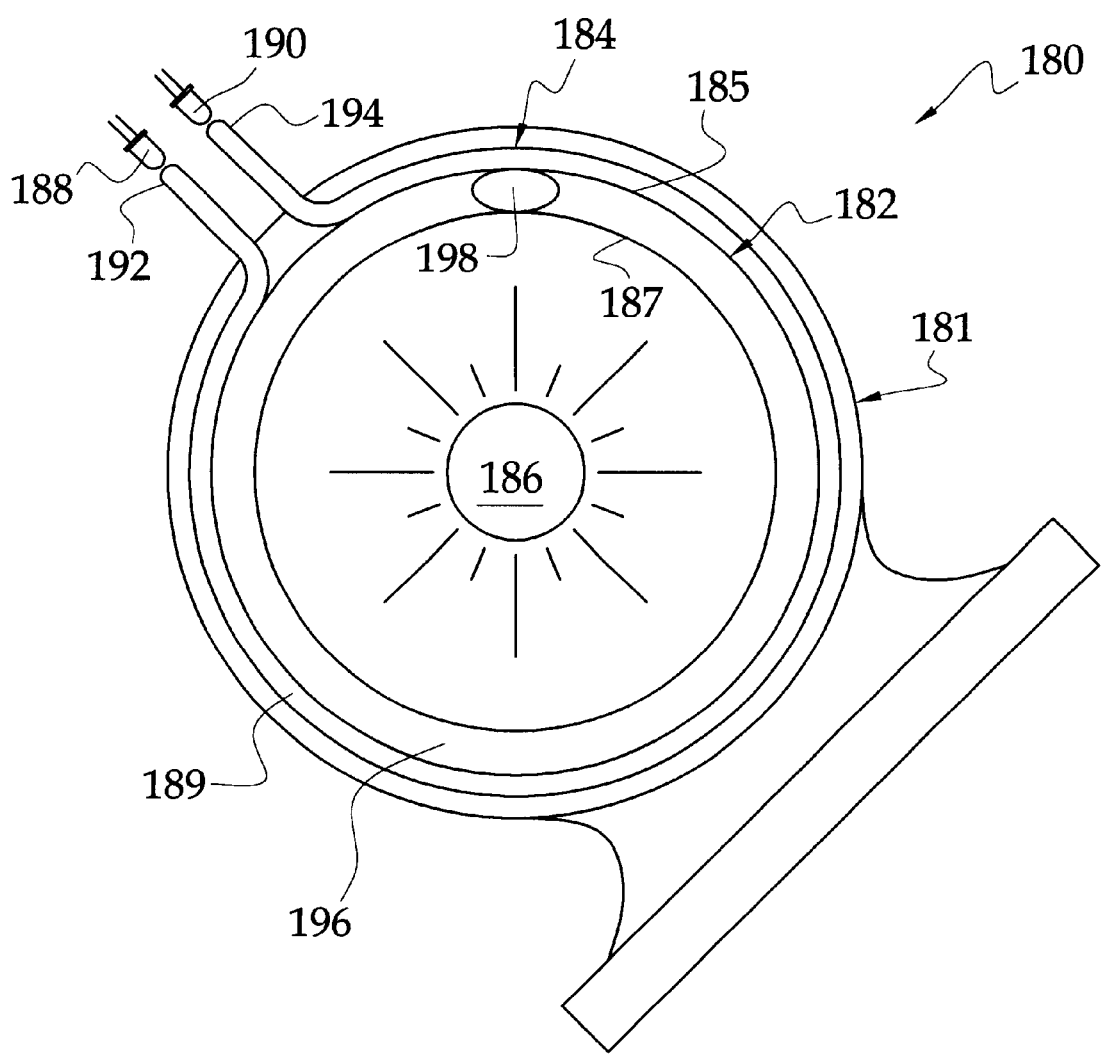
FIG. 12 is a front view of an optical transducer according to a fourth embodiment of the invention.

With reference now to FIG. 12, an schematic representation of an optical transducer 180 according to a fourth embodiment of the invention is illustrated. The optical transducer 180 includes a housing or base member 181, a ring-shaped vial 182 mounted to the base member, an elongate light collector 184 having a ring-shaped section 189 positioned adjacent an outer circumferential side 185 of the vial and conforming to the shape thereof, a light source 186 located centrally of an inner circumferential side 187 of the vial opposite the collector 184 and arranged for emitting light toward the vial, and a photosensor 188 and 190 positioned at opposite ends 192 and 194, respectively, of the light collector 184. An opaque liquid 196 or other flowable material that exhibits liquid-like properties, such as sand or other granular materials or the like, is located in the enclosed vial 182 but does not fill the vial so that a relatively transparent bubble or window 198 extends through the vial from the outer side 185 to the inner side 187 thereof.

The collector 184 is preferably similar in construction to the collector 20 previously described, including any variations thereof, such that light received on the collector 154 is transmitted to the ends 162, 164 of the collector and detected by the photosensors. Although not shown, the ring-shaped section 189 of the collector 184 may overlap so that continuous measurement can be made over 360 degrees. The light source 186 preferably emits a circular light pattern such that radiant energy is incident on the entire inner circumferential side 187. The photosensors 188, 190 can also be constructed as previously described with the FIG. 1 embodiment, including any variations thereof.

When radiant energy is transmitted to the vial from the light source 186, the opaque liquid at least substantially blocks the radiant energy from reaching the collector 184 with the exception of a portion of the radiant energy that is transmitted onto the collector 184 through the window 198. As the angular transducer 180 is subject to tilting or rotation, the window 198 will always remain at the highest point of the vial. Since the collector 184 rotates with respect to the window, the distances of the light paths between the window and the ends 192, 194 of the collector change during rotation to thereby change the intensity of light present at each of the ends 192, 194. The amount of intensity at each collector end 192 and 194 is measured by the photosensors 188 and 190, respectively, to thereby determine the position of the window 198, and thus the tilt or rotation of the optical transducer 180. This embodiment is particularly advantageous over the previous embodiment in that a greater range of angles can be measured, and the number of rotations of the transducer 180 can be determined, as previously described with respect to the FIGS. 1 and 8 embodiments.

Referring now to FIGS. 13 to 16, a schematic representation of an optical transducer 200 according to a fifth embodiment of the invention is illustrated. The optical transducer 200 comprises a hollow container or vial 202, a pair of light collectors 204, 206 mounted to the container, a light source 203 (shown in hidden line) mounted for projecting radiant energy into the container, with photosensors 208 and 210 arranged at opposite ends 205 and 207, respectively, of the light collector 204, and photosensors 212 and 214 arranged at opposite ends 209 and 211, respectively, of the light collector 206.

Figure 14:
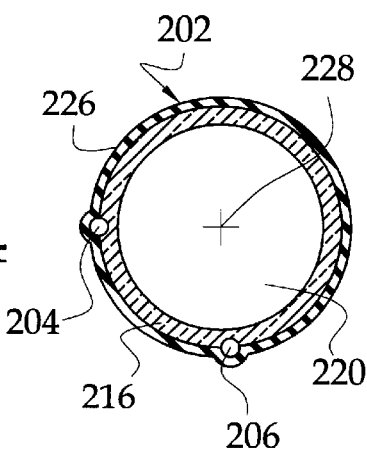
FIG. 14 is a cross sectional view taken along line 14—14 of FIG. 13.

The container 202 is preferably cylindrical in shape and includes a continuous wall 216 connected between a bottom wall 220 and a top wall 222 to thereby form an enclosed, hollow interior 218. An opaque light blocking liquid 224 or other flowable material that exhibits liquid-like properties, such as sand or other granular materials or the like, is located in the hollow interior 218 and preferably fills about half the container. As shown in FIG. 14, the container 202 is preferably constructed of a transparent material, and may be covered by an outer layer 226 of opaque material to prevent the projection of ambient light onto the collectors 204, 206.

The light collectors 204, 206 are similar in material construction to the light collector 20 previously described, and are preferably mounted to the continuous wall 216 in a direction parallel to a central axis 228 of the container. Preferably, the light collector 206 is circumferentially spaced from the light collector 204 by an angle of 90 degrees.

In operation, the light source 203 projects radiant energy into the container 202 and onto the light collectors 204, 206 not covered by the opaque liquid 224. When the optical transducer is on a level surface, the collectors will be equally covered and uncovered by the opaque liquid. In this position, the amount of light is equally present at the upper ends 205 and 209 of the collectors and is greater than the amount of light equally present at the lower ends 207 and 211 of the collectors. The difference in luminous intensity between the upper and lower ends of the collectors is due to the position of the light source 203. Consequently, the signals generated by the upper photosensors 208 and 212 are substantially equal and greater than the substantially equal signals generated by the lower photosensors 210 and 214.

Figure 13:
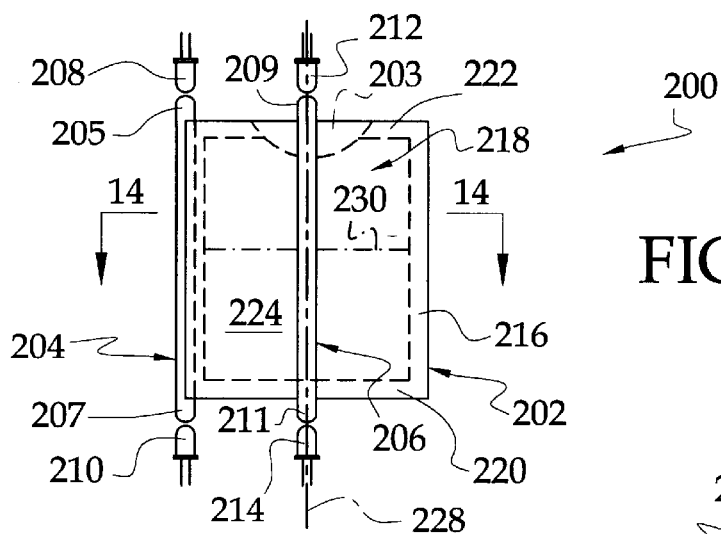
FIG. 13 is a front view of an optical transducer according to a fifth embodiment of the invention in a first orientation.
Figure 15:
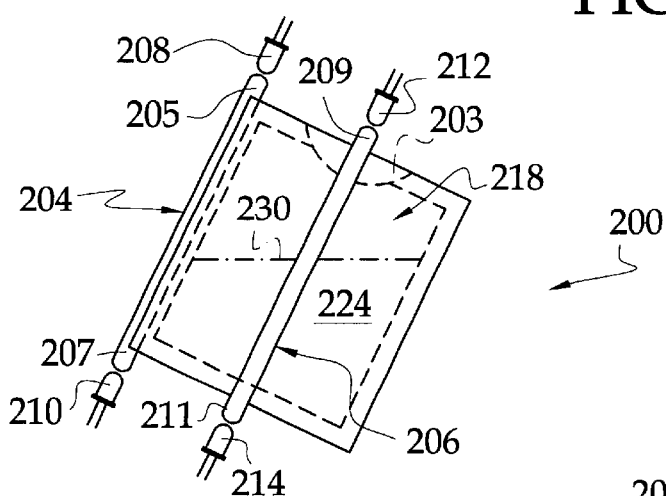
FIG. 15 is a view similar to FIG. 13 with the optical transducer in a second orientation.
Figure 16:
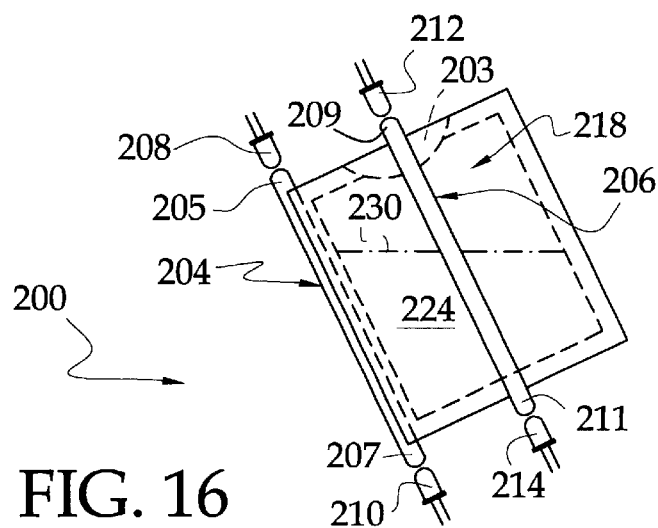
FIG. 16 is a view similar to FIG. 13 with the optical transducer in a third orientation.

As the optical transducer 200 tilts in a first plane from the FIG. 13 position to the FIG. 15 position, more of the collector 204 is exposed to radiant energy from the light source 203. Consequently, the intensity of light at the ends of the collector 204 increases to thereby cause a corresponding increase in signal output of the photosensors 208 and 210. Since the photosensor 208 is already near its maximum signal output at the FIG. 13 position due to the position of the light source 203, the change in signal output will be much less than the change in signal output of the lower photosensor 210. Likewise, as the optical transducer 200 tilts in a plane from the FIG. 13 position to the FIG. 16 position, less of the collector 204 is exposed to radiant energy from the light source 203. Consequently, the intensity of radiant energy at the ends of the collector 204 decreases to thereby cause a corresponding decrease in signal output. Again, due to the position of the light source 203, the decrease in radiant intensity at the lower end 207 of the collector 204 will normally be much greater than the decrease in radiant intensity at the upper end 205.

During tilt of the optical transducer in the first plane, the light intensities at the ends of the collector 206 remain, for the most part, unchanged. When the optical transducer is tilted in a second plane perpendicular to the first plane, the light intensities at the ends of the collector 206 will change in a manner similar to the collector 204 as described above, while the light intensities at the ends of the collector 204 will remain substantially unchanged. When simultaneous tilting occurs in both planes, the light intensities at the ends of the collectors 204 and 206 will simultaneously change in proportion to the amount of tilting.

Although two photosensors are associated with each collector, a single photosensor for each collector may be suitable. When a single photosensor is used for each collector, it is preferable that the photosensors be located at the lower ends 207 and 211 of the collectors in order to obtain the greatest measurement bandwidth.

Figure 17:
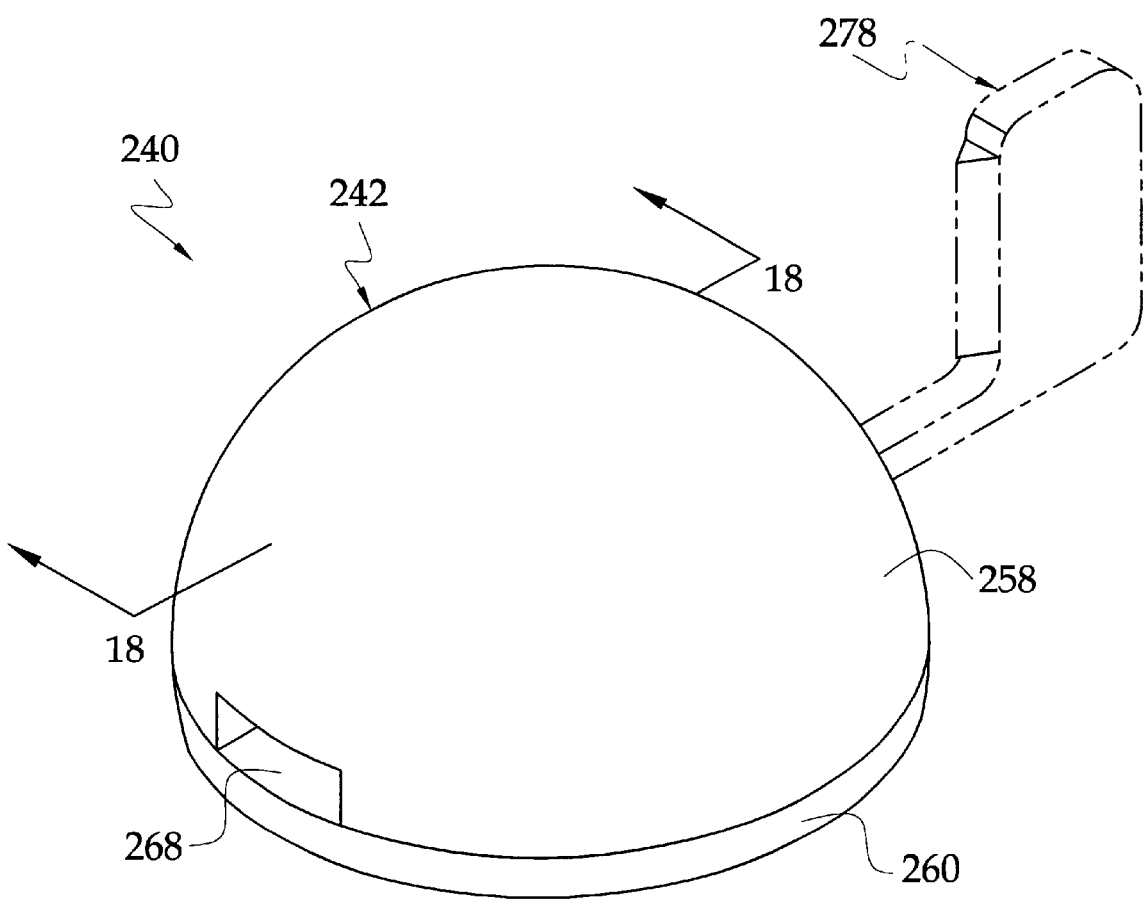
FIG. 17 is an orthogonal view of an optical transducer according to a sixth embodiment of the invention.
Figure 18:
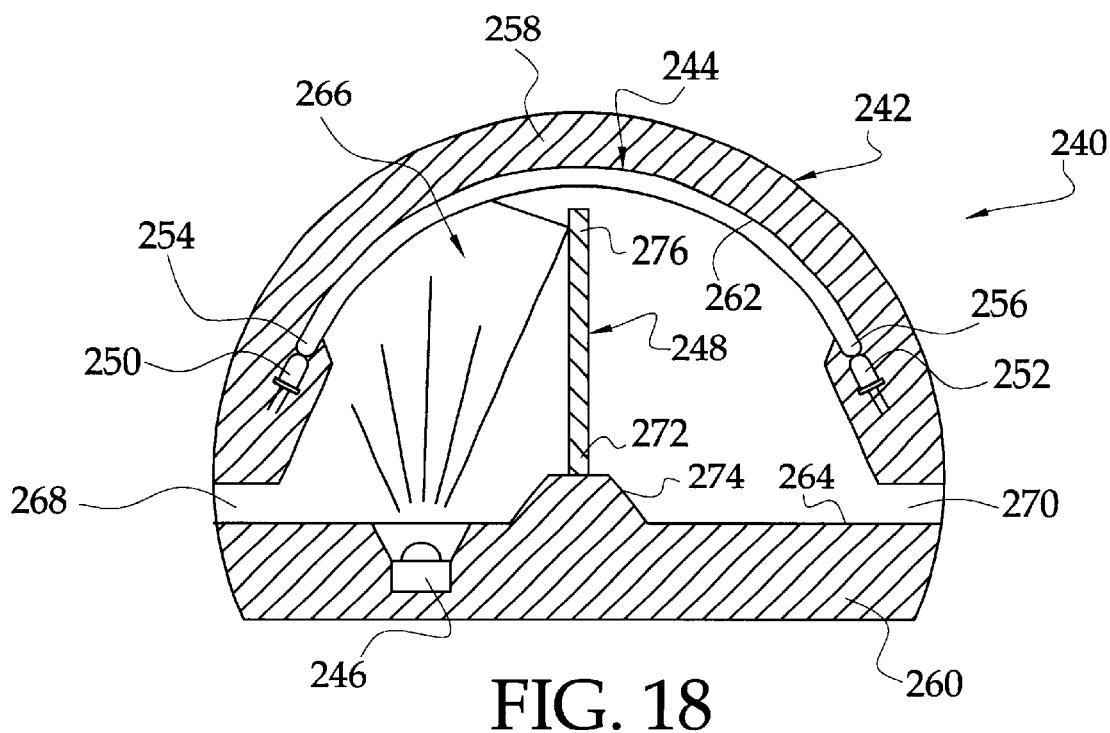
FIG. 18 is a cross sectional view of the optical transducer taken along line 18—18 of FIG. 17 and showing a light blocking member in a first or neutral position.
Figure 19:
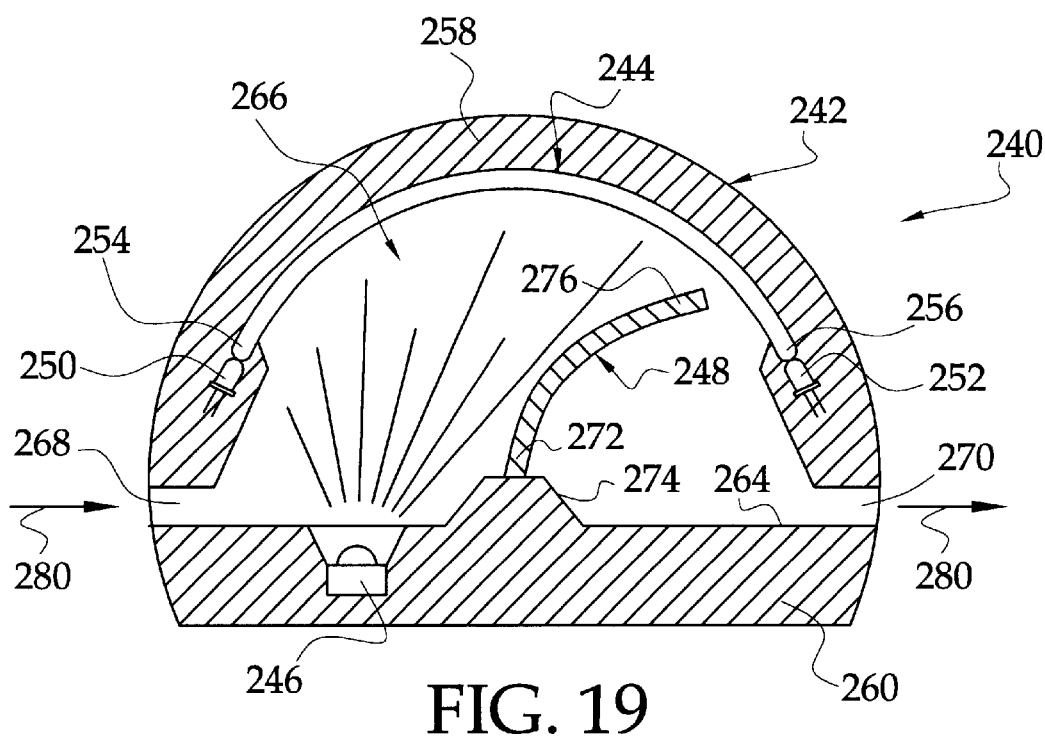
FIG. 19 is a cross sectional view similar to FIG. 17 with the light blocking member in a second position.

With reference now to FIGS. 17 to 19, an optical transducer 240 according to a sixth embodiment of the invention is shown. The optical transducer 240 is useful for measuring forces due to acceleration, fluid flow, gravity, or the like. The optical transducer 240 includes a housing 242, a light collector 244 mounted to the housing, a light source 246 mounted to the housing and arranged for projecting radiant energy onto the collector, a light blocking member 248 connected to the housing proximal the light source, and a pair of photosensors 250 and 252 located at opposite ends 254 and 256, respectively, of the collector.

The light collector 244, photosensors 250, 252, and the light source 246 may be constructed as previously described with respect to the first embodiment, including any variations thereof.

The housing 242 is preferably semi-spherical in shape, and includes an upper arcuately-shaped wall 258 with an inner arcuate surface 262 and a lower wall 260 with an inner surface 264 that together form a hollow interior 266. A pair of openings 268, 270 are formed on diametrically opposite sides of the housing.

The light collector 244 is preferably mounted to the inner arcuate surface 262 through adhesives, mechanical brackets and/or fasteners, or other well-known means of attachment, while the light source 246 is mounted to the lower wall 260.

The light blocking member 248 is preferably constructed of a thin sheet of material, such as metal or plastic, and exhibits some amount of flexibility when subjected to directly applied or induced forces. The amount of flexibility may vary depending on the particular range of forces to be measured. The light blocking member 248 is mounted to the lower wall 260 in cantilever fashion, and has a first end 272 mounted to a step 274 formed on the inner surface 264 and an outer free end 276 normally positioned adjacent the light collector 244 in the neutral position.

When used as a fluid flow meter, such as for wind speed, the housing 242 may be mounted for rotation on a base (not shown) and a vane 278 (shown in phantom line in FIG. 17) may be mounted to the housing so that one of the openings always faces wind direction. For measurement of fluid flow that is always in the same direction or opposing directions, such as within a pipe or conduit, the vane may be eliminated and the housing 242 may be mounted against movement in the pipe or conduit with the openings facing the direction of fluid flow.

In operation, the light blocking member 248 is initially in a neutral position as shown in FIG. 18 when not subject to fluid flow or other forces. In this position, radiant energy from the light source 246 is blocked from reaching approximately half the light collector 244. The photosensors 250 and 252 detect the amount of light incident on the light collector. When fluid flows through the opening 268 in a direction 280, and into the hollow interior 266 of the housing, the light blocking member is forced into a flexed position, as shown in FIG. 19. The amount of flexure depends on the stiffness of the light blocking member and the fluid velocity or acceleration. As the light blocking member flexes, a greater length of the collector is exposed to the radiant energy and a corresponding increase in light intensity at the ends 254 and 256 of the light collector is measured by the photosensors 250 and 252, respectively. As in the previous embodiment, the increase in light intensity at the end 256 of the collector will be greater than the end 254 due to the position of the light source 246. Thus, the photosensor 252 will exhibit a greater signal change than the photosensor 250. Of course, when fluid flow is in the opposite direction, the light blocking member 248 will flex in the opposite direction to thereby block more of the collector from the radiant energy.

When the optical transducer 240 is used as a force transducer for acceleration (including deceleration), vibration, and the like, the openings 268, 270 may be eliminated, and relatively clear damping fluid, such as mineral oil, may be located in the hollow interior 266. Due to the cantilever mounting of the light blocking member 248, a predetermined amount of flexure will occur, depending on the particular flexibility chosen for the light blocking member, when subject to forces. The amount of flexure, which is directly related to force, can then be measured with one or more of the photosensors 250, 252. If desired, a weight (not shown), can be mounted to the outer free end 276 of the light blocking member 248 to give greater responsiveness to applied forces.

The above-described arrangement may also or alternatively be used for measuring the orientation and direction of rotation of the optical transducer 240 with respect to horizontal or vertical. As the optical transducer is rotated, the light blocking member, especially with an attached weight at its outer free end, may exhibit increasing flexure when subject to increasing gravitational forces. Again, the amount of flexure depends on the flexibility of the light blocking member and the amount of weight, if any, connected thereto.

In a modified arrangement, the blocking member itself may include a flexible fiber optic, light pipe, or the like, or may be formed of a flexible fiber optic for projecting radiant energy onto the light collector 244.

Figure 20:
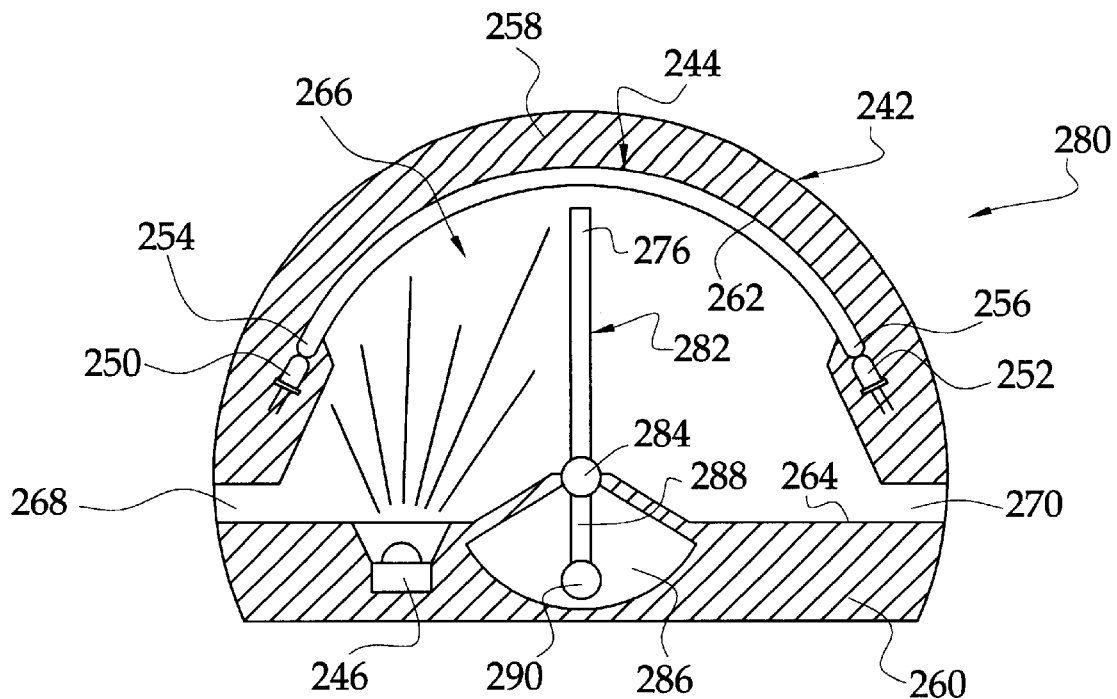
FIG. 20 is a cross sectional view of an optical transducer according to a seventh embodiment of the invention with a light blocking member in a first or neutral position.
Figure 21:
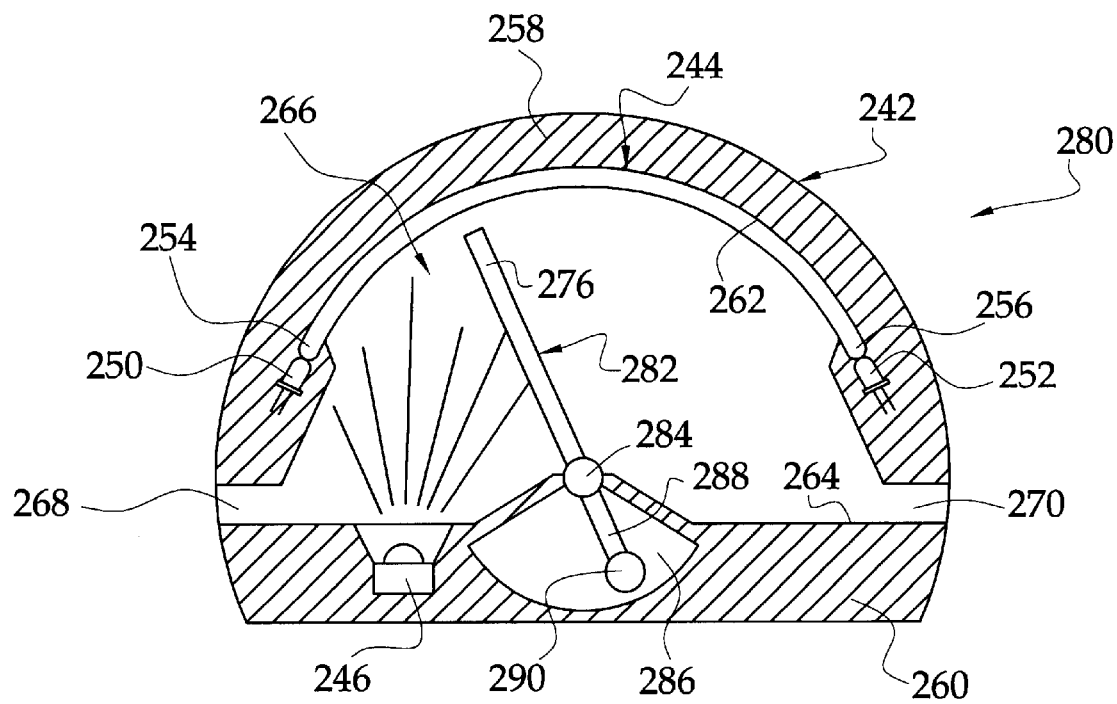
FIG. 21 is a cross sectional view similar to FIG. 19 with the light blocking member rotated to a second position.

Referring now to FIGS. 20 and 21, an optical transducer 280 according to a seventh embodiment of the invention is illustrated, wherein like parts in the previous embodiment are represented by like numerals. In this embodiment, a damping chamber 286 is formed in the lower wall 260. A relatively stiff light blocking member 282 is pivotally mounted to the wall 260 at a pivot joint 284 with a lower end 288 of the light blocking member extending into the damping chamber. A weight 290 is mounted on the lower end 288 for returning the damping member to a neutral position when not subject to applied or induced forces. Alternatively, the weight 290 may be replaced with a return spring or similar mechanism. Damping fluid is preferably located in the damping chamber 286 for damping rotational movement of the blocking member 282.

Operation of the optical transducer 280 is similar to the previous embodiment, with the exception that the light blocking member 282 pivots about the pivot joint 290 when subject to applied or induced forces. In this manner, more or less of the light collector 244 is exposed to radiant energy from the light source 246, depending on the direction of pivotal movement. The amount of light collector length exposed to the radiant energy is measured by one or both of the photosensors 250 and 252.

In a modified arrangement, the light source 246 may be located at the outer free end 276 of the blocking member for movement therewith. In a further arrangement, the blocking member itself may include a fiber optic, light pipe, or the like, for projecting radiant energy onto the light collector 244.

In each of the above embodiments, one or both photosensors may be separated from the ends of the light collector by one or more intermediate structures, such as fiberoptics, light pipes, conduits, or other light transmitting means. It is to be understood therefore, that the terms "adjacent" and "proximal" as used throughout the specification in reference to the position of the photosensors with respect to the ends of the collector may include such intermediate structures. Moreover, although two photosensors are shown in each of the above embodiments, it is to be understood that only a single photosensor may be used for measuring the position of light on the collector.

The term "opaque" as used throughout the specification refers to any material that blocks a sufficient amount of light from the collector(s) such that movement of the blocking member is detectable. Thus, translucent blocking members or blocking members filtering out certain wave lengths of radiant energy may also be suitable for use in the above embodiments.

Moreover, although the light source in each of the above embodiments is arranged opposite the light collector for transmitting radiant energy directly to the light collector, it is to be understood that the light source may be arranged in other orientations and/or locations, and may comprise mirrors, lenses, fiber optics, and so on, for transmitting radiant energy to the light collector.

It is to be understood that the terms upper, lower, inner, and outer, as well as their respective derivatives as used throughout the specification, refer to relative, rather than absolute orientations or positions.

While the invention has been taught with specific reference to these embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. An optical transducer, comprising:
    a light source for emitting radiant energy;
    an elongate light collector positioned relative to the light source for receiving radiant energy from the light source, the light collector having opposite ends and being formed such that radiant energy incident on a length of the light collector from the light source can be transmitted to the light collector ends, the intensity of radiant energy at one of the light collector ends increasing as the incident radiant energy travels along the length of the light collector towards the one end;
    a light blocking member extending between the light source and at least a portion of the elongate light collector for blocking at least a portion of the radiant energy from the light collector, the light blocking member and light collector being relatively movable for varying the position of the radiant energy incident on the light collector to thereby vary the amount of radiant energy transmitted to at least the one light collector end; and
    at least one photosensor positioned for detecting the amount of radiant energy transmitted to at least the one end;
    wherein the intensity of radiant energy received by the one light collector end and detected by the photosensor is indicative of the relative movement.

2. An optical transducer according to claim 1, wherein the light blocking member blocks a substantial portion of the light collector from the radiant energy.

3. An optical transducer according to claim 2, wherein the light blocking member has a relatively transparent window in alignment with the light collector through which radiant energy from the light source is projected and received by a portion of the light collector, the window being movable along a length of the light collector during relative movement between the light collector and the blocking member to thereby vary the position of the radiant energy incident on the light collector.

4. An optical transducer according to claim 1, wherein the light blocking member has a relatively transparent window in alignment with the light collector through which radiant energy from the light source is projected and received by the light collector, the window being movable along a length of the light collector during relative movement between the light collector and the blocking member to thereby vary the position of the radiant energy incident on the light collector.

5. An optical transducer according to claim 4, wherein the light blocking member comprises a disk rotatable about a central disk axis with the window being formed on the disk, and further wherein the collector has an arcuate section in alignment with the window, such that rotation of the disk about the central disk axis with respect to the light collector varies the position of the radiant energy incident on the arcuate section of the light collector.

6. An optical transducer according to claim 4, wherein the light blocking member comprises a tube rotatable about a central tube axis, the window being formed on the tube, and further wherein the collector has an arcuate section in alignment with the window, such that rotation of the tube about the central tube axis with respect to the housing varies the position of the radiant energy incident on the arcuate section of the light collector.

7. An optical transducer according to claim 4, wherein the light blocking member comprises an enclosed vial with a fluent light blocking material filling a portion of the vial, the window being formed at a position in the vial absent the fluent material;
    wherein rotation of the optical transducer causes the fluent material to flow under gravity and thereby change the position of the window and thus the position of the radiant energy incident on the light collector.

8. An optical transducer according to claim 7, wherein the fluent material comprises a relatively opaque liquid.

9. An optical transducer according to claim 7, wherein the fluent material comprises granular material.

10. An optical transducer according to claim 1, and further comprising a base member, and further wherein the light blocking member comprises a flexible plate having a first end fixedly mounted to the base member and a second free end adjacent the light collector, the free end being movable in response to the applied force to thereby change a length of the light collector exposed to the radiant energy.

11. An optical transducer according to claim 1, and further comprising a base member, and further wherein the light blocking member comprises a relatively stiff plate having a first end portion rotatably mounted to the base member about a pivot joint and a second free end portion adjacent the light collector, the plate being rotatable about the pivot joint in response to the applied force to thereby change a length of the light collector exposed to the radiant energy.

12. An optical transducer according to claim 11, wherein a damping chamber is formed in the base member, and further wherein the first end portion extends into the damping chamber for damping movement of the light blocking member.

13. An optical transducer according to claim 12, and further comprising means for biasing the light blocking member to a neutral position.

14. An optical transducer according to claim 1, wherein the light collector comprises a fluorescent-doped fiber optic.

15. An optical angular position transducer according to claim 1, wherein the intensity of radiant energy at the other end of the light collector decreases as the incident radiant energy travels along the length of the light collector toward the one end.

16. An optical transducer, comprising:
    a light source for emitting radiant energy;
    an elongate light collector spaced from the light source for receiving radiant energy from the light source, the light collector having opposite ends and being formed such that radiant energy emitted from the light source can be gathered along a length of the light collector and transmitted to the light collector ends;
    a light blocking member extending between the light source and at least a portion of the elongate light collector for blocking at least a portion of the radiant energy from the light collector, the light blocking member comprising an enclosed vial with a fluent light blocking material filling a portion of the vial;

a window formed at a position in the vial absent the fluent light blocking material, such that radiant energy from the light source can project through the window and be received by the light collector;

the window and the light collector being relatively movable for varying the position of the radiant energy incident on the light collector to thereby vary the amount of radiant energy transmitted to the light collector ends; and at least one photosensor positioned for detecting the amount of radiant energy transmitted to at least one of the light collector ends;

wherein the amount of radiant energy received by the light collector and detected by the photosensor is indicative of the relative movement, and wherein the enclosed vial is ring-shaped, and the light collector includes a ring-shaped section adjacent the vial.

17. An optical transducer, comprising:

a light source for emitting radiant energy;

an elongate light collector spaced from the light source for receiving radiant energy from the light source, the light collector having opposite ends and being formed such that radiant energy emitted from the light source can be gathered along a length of the light collector and transmitted to the light collector ends;

a light blocking member extending between the light source and at least a portion of the elongate light collector for blocking at least a portion of the radiant energy from the light collector, the light blocking member comprising an enclosed vial with a fluent light blocking material filling a portion of the vial;

a window formed at a position in the vial absent the fluent light blocking material, such that radiant energy from the light source can project through the window and be received by the light collector;

the window and the light collector being relatively movable for varying the position of the radiant energy incident on the light collector to thereby vary the amount of radiant energy transmitted to the light collector ends; and at least one photosensor positioned for detecting the amount of radiant energy transmitted to at least one of the light collector ends;

wherein the amount of radiant energy received by the light collector and detected by the photosensor is indicative of the relative movement, and wherein the vial is cylindrical-shaped, and the light collector extends substantially parallel to a longitudinal axis of the vial;

wherein rotation of the optical transducer about a first axis of rotation causes the fluent material to flow under gravity and thereby change a length of the light collector exposed to the radiant energy.

18. An optical transducer according to claim 17, and further comprising:

a second light collector having opposite ends, the second light collector being connected to the vial and extending substantially parallel to the longitudinal axis of the vial, the second light collector being circumferentially spaced from the first-mentioned light collector by approximately 90 degrees; and at least a second photosensor positioned proximal at least one of the second light collector ends for detecting the amount of radiant energy transmitted to the second light collector;

wherein rotation of the optical transducer about a second axis of rotation perpendicular to the first axis of rotation is detected by the second photosensor.

19. An optical angular position transducer, comprising:

a housing having a front wall, a rear wall, and a continuous side wall extending between the front and rear walls to form an inner compartment, a light source mounted for emitting radiant energy into the inner compartment;

an elongate light collector mounted in the inner compartment for receiving radiant energy from the light source, the light collector having opposite ends and an arcuate section located between the ends, the light collector being formed such that radiant energy incident on a length of the light collector from the light source can be transmitted to the light collector ends, the intensity of radiant energy at one of the light collector ends increasing as the incident radiant energy travels along the length of the light collector towards the one end;

a shaft having a first end portion rotatably mounted in the inner compartment about a longitudinal shaft axis and a second end portion extending out of the housing;

a light blocking disk mounted on the shaft for rotation therewith, the light blocking disk extending between the light source and the elongate light collector for substantially blocking the transmission of radiant energy from light source to the light collector, the disk including a relatively transparent window in alignment with the arcuate section of the light collector through which radiant energy from the light source is projected and received by a portion of the light collector, such that rotation of the disk about the longitudinal shaft axis with respect to the housing varies the position of the radiant energy incident on the arcuate section of the light collector to thereby vary the amount of radiant energy transmitted to the ends of the light collector; and at least one photosensor positioned proximal at least one of the light collector ends for detecting the amount of radiant energy transmitted thereto;

wherein the amount of radiant energy received by the light collector and detected by the at least one photosensor is indicative of the angular position of the shaft about the longitudinal shaft axis.

20. An optical angular position transducer according to claim 19, wherein the light collector comprises a fluorescent-doped fiber optic.

21. An optical angular position transducer according to claim 20, wherein the intensity of radiant energy at the other end of the light collector decreases as the incident radiant energy travels along the length of the light collector toward the one end.

22. An optical transducer, comprising:

a light source for emitting radiant energy;

an elongate light collector spaced from the light source for receiving radiant energy from the light source, the light collector having opposite ends and being formed such that radiant energy emitted from the light source can be gathered along a length of the light collector and transmitted to the light collector ends;

a light blocking member extending between the light source and at least a portion of the elongate light collector for blocking at least a portion of the radiant energy from the light collector, the light blocking member comprising an enclosed vial with a fluent light blocking material filling a portion of the vial;

a window formed at a position in the vial absent the fluent light blocking material, such that radiant energy from the light source can project through the window and be received by the light collector;

the window and the light collector being relatively movable for varying the position of the radiant energy incident on the light collector to thereby vary the amount of radiant energy transmitted to the light collector ends; and at least one photosensor positioned for detecting the amount of radiant energy transmitted to at least one of the light collector ends;

wherein the amount of radiant energy received by the light collector and detected by the photosensor is indicative of the relative movement, and wherein the enclosed vial is arcuate-shaped, and the collector includes an arcuate-shaped section adjacent the vial.

\* \* \* \* \*